US012780322B2

(12) United States Patent
Jungmann

(10) Patent No.: US 12,780,322 B2
(45) Date of Patent: Nov. 3, 2026

(54) AIR DUCT INTEGRATION INTO CROSS-CAR BEAM STRUCTURE

(71) Applicant: Atieva, Inc., Newark, CA (US)

(72) Inventor: Lucas Jungmann, Newark, CA (US)

(73) Assignee: Atieva, Inc., Newark, CA (US)

( * ) Notice: Subject to any disclaimer, the term of this patent is extended or adjusted under 35 U.S.C. 154(b) by 209 days.

(21) Appl. No.: 18/561,593

(22) PCT Filed: May 6, 2022

(86) PCT No.: PCT/US2022/072168
§ 371 (c)(1),
(2) Date: Nov. 16, 2023

(87) PCT Pub. No.: WO2022/246367
PCT Pub. Date: Nov. 24, 2022

(65) Prior Publication Data

US 2024/0253708 A1 Aug. 1, 2024

Related U.S. Application Data

(60) Provisional application No. 63/201,869, filed on May 17, 2021.

(51) Int. Cl.

| | |
|---|---|
| ***B62D 25/14*** | (2006.01) |
| ***B60H 1/00*** | (2006.01) |
| ***B60K 37/00*** | (2024.01) |

(52) U.S. Cl.
CPC ....... *B62D 25/142* (2013.01); *B60H 1/00564* (2013.01); *B60K 37/00* (2013.01); *B62D 25/145* (2013.01)

(58) Field of Classification Search
CPC ................ B62D 25/142; B62D 25/145; B60H 1/00564; B60H 1/0055; B60K 37/00; B60K 2360/658
See application file for complete search history.

(56) References Cited

U.S. PATENT DOCUMENTS

| | | | |
|---|---|---|---|
| 4,646,879 | A | 3/1987 | Mahler et al. |
| 5,762,395 | A | 6/1998 | Merrifield et al. |
| 6,273,495 | B1 | 8/2001 | Haba et al. |
| 6,582,011 | B2 | 6/2003 | Palazzolo et al. |

(Continued)

FOREIGN PATENT DOCUMENTS

| | | | |
|---|---|---|---|
| AT | 9699 | U1 | 2/2008 |
| DE | 4232847 | A1 | 3/1994 |

(Continued)

OTHER PUBLICATIONS

International Search Report and Written Opinion for PCT Application No. PCT/US2022/072168, mailed on Aug. 17, 2022, 9 pages.

(Continued)

*Primary Examiner* — Patricia L Engle
(74) *Attorney, Agent, or Firm* — Brake Hughes Bellermann LLP

(57) ABSTRACT

A system comprises: a cross-car beam; a cross-car beam structure attached to the cross-car beam; an air duct; and an air vent, wherein the cross-car beam and the cross-car beam structure form a channel for air flow between the air duct and the air vent.

14 Claims, 15 Drawing Sheets

(56) References Cited

U.S. PATENT DOCUMENTS

| | | | | |
|---|---|---|---|---|
| 9,580,107 | B1 | 2/2017 | Ranga | |
| 2002/0030386 | A1 | 3/2002 | Neuss et al. | |
| 2002/0038965 | A1 | 4/2002 | Palazzolo et al. | |
| 2002/0130529 | A1 * | 9/2002 | Takano | B60K 37/20 296/70 |
| 2004/0212211 | A1 * | 10/2004 | Beckley | B60H 1/00514 296/70 |
| 2004/0262954 | A1 * | 12/2004 | Scheib | B62D 29/004 296/193.02 |
| 2006/0186650 | A1 * | 8/2006 | Kuwano | B60K 37/20 180/90 |
| 2011/0272961 | A1 * | 11/2011 | Scheib | B62D 29/005 296/72 |
| 2015/0217624 | A1 * | 8/2015 | Herr-Rathke | B62D 29/005 296/193.02 |
| 2020/0247478 | A1 * | 8/2020 | Kehimkar | B62D 25/142 |
| 2021/0001925 | A1 * | 1/2021 | Choi | B62D 29/008 |
| 2024/0034414 | A1 * | 2/2024 | Adam | B62D 29/043 |
| 2025/0145209 | A1 * | 5/2025 | Kong | B62D 29/004 |

FOREIGN PATENT DOCUMENTS

| | | | | |
|---|---|---|---|---|
| DE | 29916467 | U1 | 12/1999 | |
| DE | 102005002829 | A1 | 8/2006 | |
| EP | 1609700 | A1 * | 12/2005 | B62D 25/142 |
| EP | 1685989 | A2 * | 8/2006 | B60H 1/242 |
| JP | S6154330 | A | 3/1986 | |
| JP | 2002274151 | A | 9/2002 | |
| JP | 2005306144 | A | 11/2005 | |
| JP | 2006205826 | A | 8/2006 | |

OTHER PUBLICATIONS

Extended European Search Report for European Application No. 22805686.7, mailed Mar. 6, 2025, 11 pages.

Office Action with English translation (machine) for Japanese Application No. 2023-564450, dated Jun. 16, 2026, 9 pages.

* cited by examiner

100

500

500

AIR DUCT INTEGRATION INTO CROSS-CAR BEAM STRUCTURE

CROSS-REFERENCE TO RELATED APPLICATION

This application is a 35 U.S.C. § 371 National Phase Entry Application from PCT Application No. PCT/US2022/072168, filed on May 6, 2022, entitled “AIR DUCT INTEGRATION INTO CROSS-CAR BEAM STRUCTURE”, and designating the U.S., which in turn claims priority to U.S. Patent Application No. 63/201,869, filed on May 17, 2021, and entitled “AIR DUCT INTEGRATION INTO CROSS-CAR BEAM STRUCTURE,” the disclosures of which are incorporated by reference herein in their entireties.

TECHNICAL FIELD

This document relates to integration of an air duct into a cross-car beam structure.

BACKGROUND

Instrument panels for vehicles are made up of several components that are tightly packaged together. The cross-car beam assembly is a structural component of the instrument panel, and is also responsible for modal, crash and quality performance. Other parts such as ducts and harnesses are routed around the instrument panel to reach their connection points. In particular, ducts are typically routed around the cross-car beam assembly as the cross-car beam is the dominant part in the instrument panel assembly.

SUMMARY

In one aspect, a system comprises: a cross-car beam; a cross-car beam structure attached to the cross-car beam; an air duct; and an air vent, wherein the cross-car beam and the cross-car beam structure form a channel for air flow between the air duct and the air vent.

Implementations can include any or all of the following features. The air vent is configured for an outboard position in a dashboard of a vehicle. The channel forms an open space that abuts at least the cross-car beam. The cross-car beam structure is attached to the cross-car beam by being overmolded onto the cross-car beam. The channel includes ribs formed by the cross-car beam structure, the ribs positioned against an external surface of the cross-car beam, and wherein portions of the external surface of the cross-car beam are exposed to the air flow between the ribs. The ribs are oriented substantially along a direction of the air flow. The air duct is formed by a first clamshell component and a second clamshell component positioned against each other. Each of the first and second clamshell components include a respective flange, and wherein the respective flanges abut each other. The system further comprises a slit formed in the cross-car beam structure, wherein the slit is configured to hold the respective flanges that are abutting each other. The system further comprises a steering column bracket attached to the cross-car beam, wherein the air duct includes a first air duct and a second air duct, and wherein a joint between the first and second air ducts is formed by sandwiching of the first and second air ducts between the steering column bracket and the cross-car beam structure. The channel is defined by a first wall orientation and a second wall orientation, and wherein the cross-car beam and the cross-car beam structure form a nonlinear transition between the first and second wall orientations. The second wall orientation is substantially parallel to and offset from the first wall orientation in a direction that is perpendicular to a plane of the first wall orientation. The system further comprises a manifold, wherein the air duct is coupled to the manifold. The manifold is installed in the system without separate fasteners and adhesive. The air duct is formed by a first clamshell component and a second clamshell component positioned against each other. Each of the first and second clamshell components include a respective flange, and wherein the respective flanges abut each other. The system further comprises a slit formed in the cross-car beam structure, wherein the manifold is installed in the system by way of the slit holding the respective flanges that are abutting each other. The system further comprises a tab extending from the manifold, the tab including a slit, wherein the manifold is installed in the system by way of the tab being folded relative to a remainder of the manifold so that a portion of the cross-car beam structure enters the slit. The system further comprises a guide tab extending from the manifold, wherein installing the manifold in the system comprises inserting the guide tab into a receptacle at the cross-car beam structure. The channel formed by the cross-car beam and the cross-car beam structure comprises integration of the air duct into a cross-car beam assembly so that the air flow passes through the cross-car beam structure.

BRIEF DESCRIPTION OF DRAWINGS

Like reference symbols in the various drawings indicate like elements.

DETAILED DESCRIPTION

Figure 1:
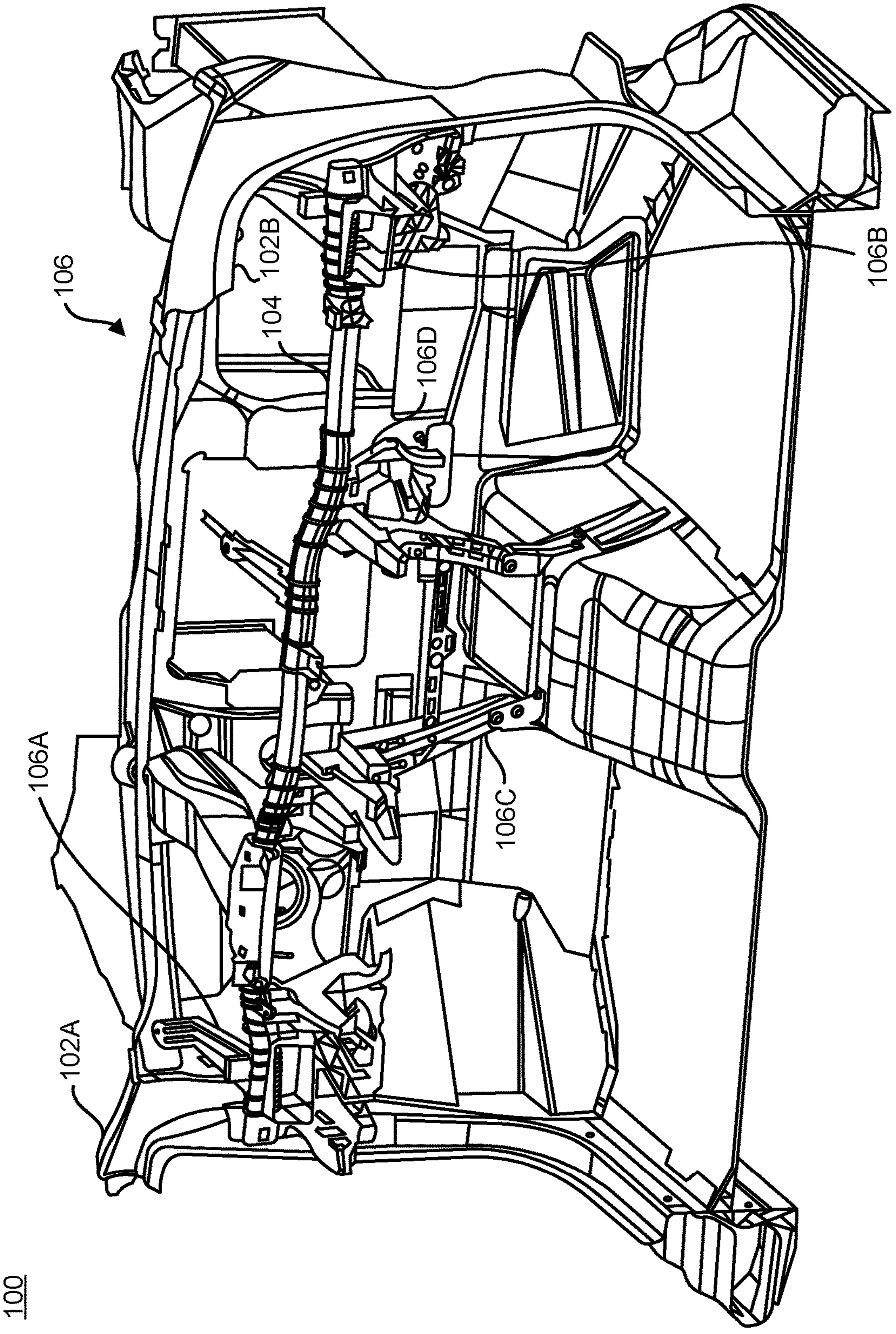
FIG. 1 shows a perspective view of an example of a cross-car beam assembly for a vehicle.

This document describes examples of systems and techniques for integration of an air duct into a cross-car beam structure. In some implementations, the cross-car beam and the cross-car beam structure can be used as an integrator between the air ducts and the air vent. Air ducts are responsible for getting air from the heating, ventilation, and air conditioning (HVAC) unit, sometimes referred to as an air blower unit, to the air vents near the occupants. The more direct the path is, the better the air vents will perform. The air duct section can be incorporated into the cross-car beam assembly so that air can pass from the duct to the air vent without the air flow path being interrupted. In some implementations, a channel formed by the cross-car beam and the cross-car beam structure can provide integration of the air duct into a cross-car beam assembly. For example, this can advantageously allow air flow to pass through the cross-car beam structure. This integration can also improve cross-car beam performance while reducing weight and eliminating redundant material or parts. For example, taking over the large section of the air duct and incorporating it into the structural cross-car beam material improves the performance of the cross-car beam assembly. Integrating the cross-car beam and the air duct together can increase the instrument panel packaging efficiency, and decrease the package size. The air flow path can be made more direct to reduce losses. By using a plastic based cross-car beam structure can provide superior heating or cooling losses compared to magnesium and steel cross-car beams.

Examples herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons. At least one vehicle occupant can be considered the driver; various tools, implements, or other devices, can then be provided to the driver. In examples herein, any person carried by a vehicle can be referred to as a “driver” or a “passenger” of the vehicle, regardless whether the person is driving the vehicle, or whether the person has access to controls for driving the vehicle, or whether the person lacks controls for driving the vehicle.

Examples herein refer to a cross-car beam. As used herein, a cross-car beam is a structural component installed in any type of vehicle so as to span substantially from one side of the vehicle to an opposite side of the vehicle. That is, cross-car beams can be used in multiple types of vehicles, some, but not necessarily all, of which may be cars. For example, a cross-car beam can extend between the left and right A-pillars of the vehicle.

Examples herein refer to a front, rear, top, or a bottom. These and similar expressions identify things or aspects in a relative way based on an express or arbitrary notion of perspective. That is, these terms are illustrative only, used for purposes of explanation, and do not necessarily indicate the only possible position, direction, and so on.

FIG. 1 shows a perspective view of an example of a cross-car beam assembly 100 for a vehicle. The cross-car beam assembly 100 or any component(s) thereof can be used with one or more other examples described elsewhere herein. Some portions of the vehicle are omitted in this illustration for simplicity. The vehicle includes a chassis that provides the structure for accommodating all other vehicle components, including, but not limited to, the drivetrain, suspension, wheels, windows, and passenger compartment.

Here, the vehicle includes A-pillars 102A-102B. The A-pillar 102A can be referred to as a left A-pillar and the A-pillar 102B can be referred to as a right A-pillar. The A-pillars 102A-102B can be made of any suitable material, including, but not limited to, a metal such as an aluminum alloy and/or steel. The cross-car beam assembly 100 is attached to the A-pillars 102A-102B.

The cross-car beam assembly 100 includes a cross-car beam 104. The ends of the cross-car beam 104 are attached to the A-pillars 102A-102B, respectively. The cross-car beam 104 can be made of any suitable material, including, but not limited to, a metal such as an aluminum alloy and/or steel. For example, the cross-car beam 104 can be formed by extrusion of a material into a longitudinal element and thereafter optionally bending of the extrusion in one or more places to produce the shape of the cross-car beam 104.

The cross-car beam assembly 100 includes at least one cross-car beam structure 106. Here, cross-car beam structures 106A-106D are shown. For example, the cross-car beam structures 106A-106B can be referred to as outboard cross-car beam structures. As another example, the cross-car beam structures 106C-106D can be referred to as center cross-car beam structures. Each of the cross-car beam structures 106 is attached to the cross-car beam 104. One or more of the cross-car beam structures 106A-106D can be attached to some part of the vehicle chassis. Here, the cross-car beam structure 106A is attached to the A-pillar 102A, and the cross-car beam structure 106B is attached to the A-pillar 102B. The cross-car beam structures 106A-106D can be made of the same materials as each other, or by two or more different materials. The cross-car beam structures 106A-106D can be made using any of multiple processes. In some implementations, injection molding can be used. For example, a thermoplastic polymer material and/or a thermosetting polymer material can be used. In some implementations, the cross-car beam structures 106A-106D can be overmolded onto the cross-car beam 104. This can allow an air duct to be integrated into the cross-car beam structures 106A-106D and thereby improve packaging efficiency, simplify the dashboard structure, and improve the performance of the cross-car beam 104, for example as described below.

Figure 2:
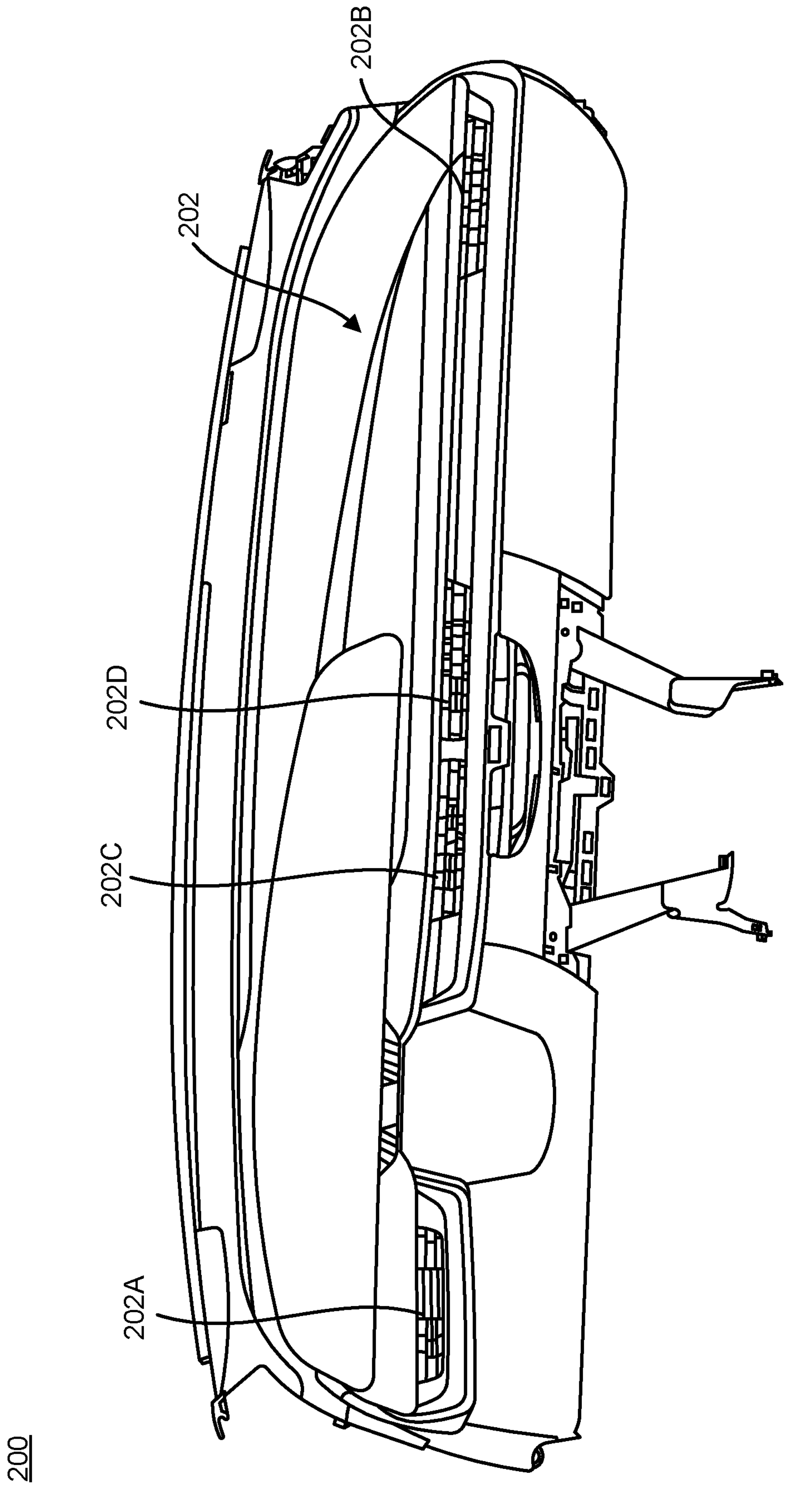
FIG. 2 shows a perspective view of an example of a dashboard having air vents.

FIG. 2 shows a perspective view of an example of a dashboard 200 having air vents 202. Some other aspects of the dashboard 200 are omitted in this illustration for simplicity. Here, air vents 202A-202D are shown. For example, the air vents 202A-202B are located at respective outboard positions near the A-pillars, and can be referred to as outboard air vents. As another example, the air vents 202C-202D can be referred to as center air vents. Each of the air vents 202 can be configured for controlling the flow of an air stream from the HVAC unit into the passenger compartment. For example, the air vent(s) 202 can be controlled by an occupant and/or a vehicle system to regulate the amount and/or the direction of the air flow at one or more locations. The dashboard 200 or any component(s) thereof can be used with one or more other examples described elsewhere herein.

Figure 3:
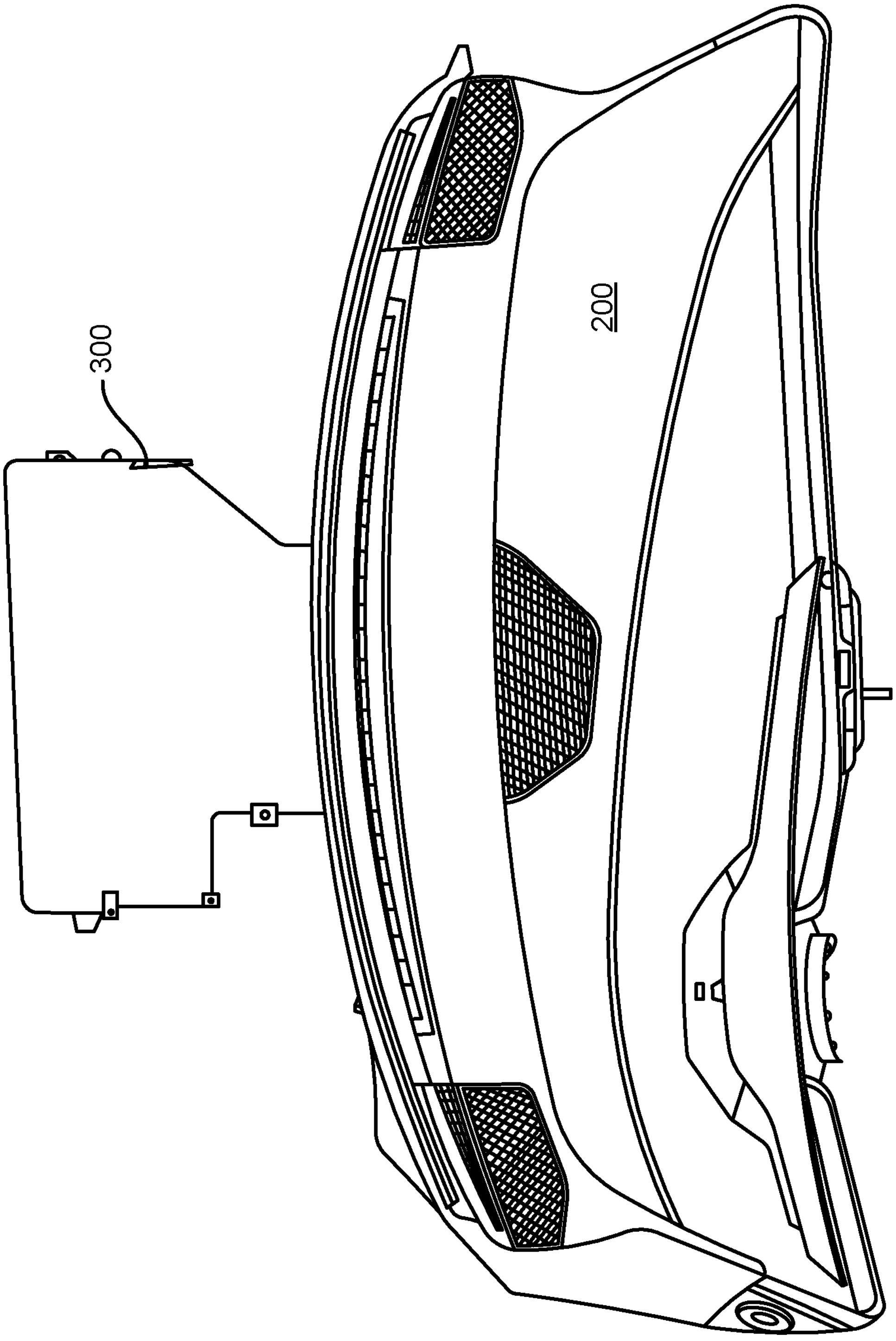
FIG. 3 shows a top view of an example of the dashboard of FIG. 2 when provided with a heating, ventilation, and air conditioning unit.

FIG. 3 shows a top view of an example of the dashboard 200 of FIG. 2 when provided with an HVAC unit 300. The HVAC unit 300 can be used with one or more other examples described elsewhere herein. In some implementations, the HVAC unit 300 is attached from the rear of the dashboard 200. For example, the HVAC unit 300 can direct respective air flows through ducts toward the air vents 202 (FIG. 2). The HVAC unit 300 can be coupled to a thermal system of the vehicle. For example, such thermal system can be configured for thermally servicing other vehicle components, such as a drivetrain and/or a battery pack.

Figure 4:
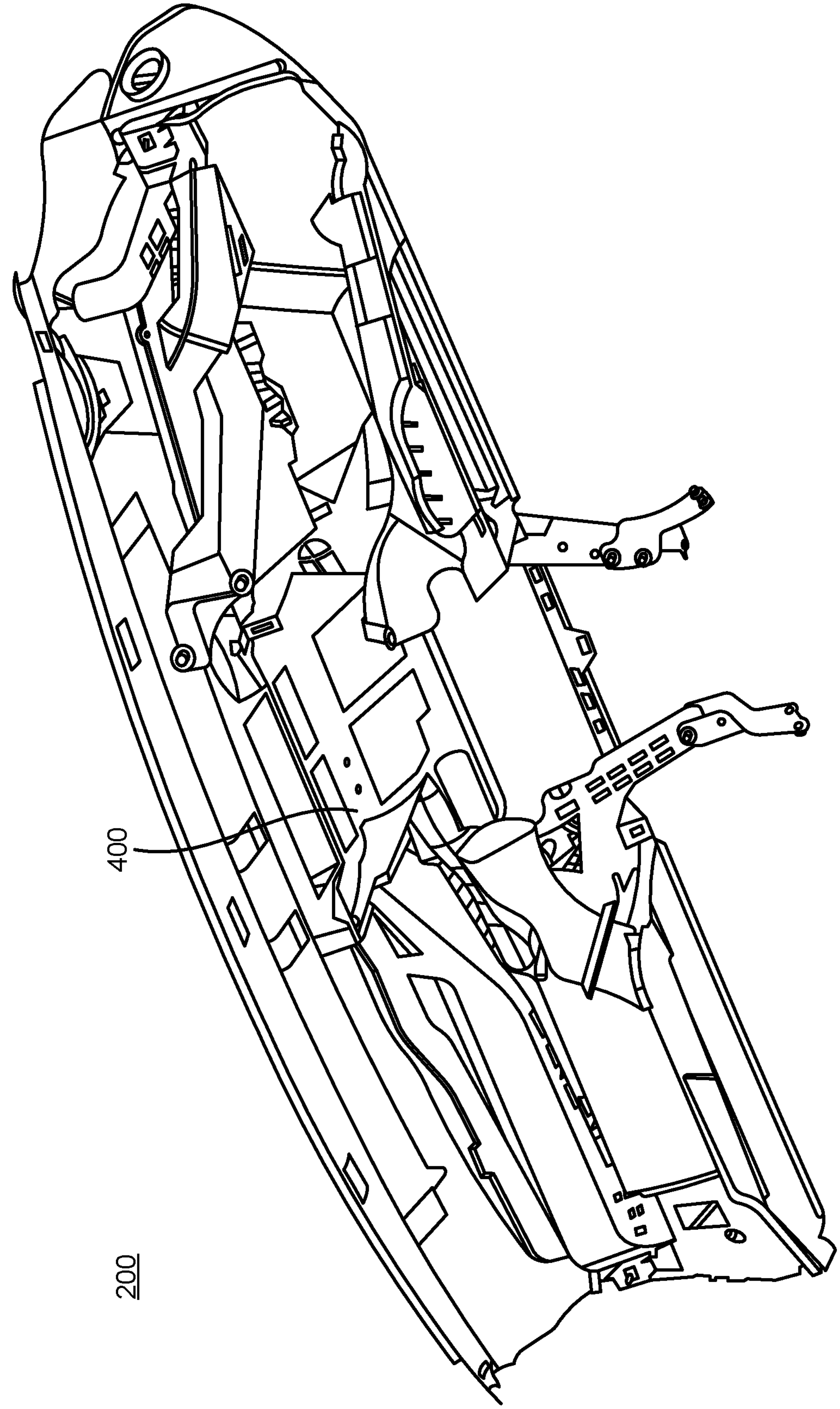
FIG. 4 shows a perspective view of a rear of the dashboard of FIG. 2 having a manifold.

FIG. 4 shows a perspective view of a rear of the dashboard 200 of FIG. 2 having a manifold 400. The manifold 400 can be used with one or more other examples described elsewhere herein. The manifold 400 can be used for distributing air flows from the HVAC unit 300 (FIG. 3) to one or more respective ones of the air vents 202 (FIG. 2). The manifold 400 can be made from any suitable material, including, but not limited to, a thermoplastic polymer material and/or a thermosetting polymer material.

Figure 5:
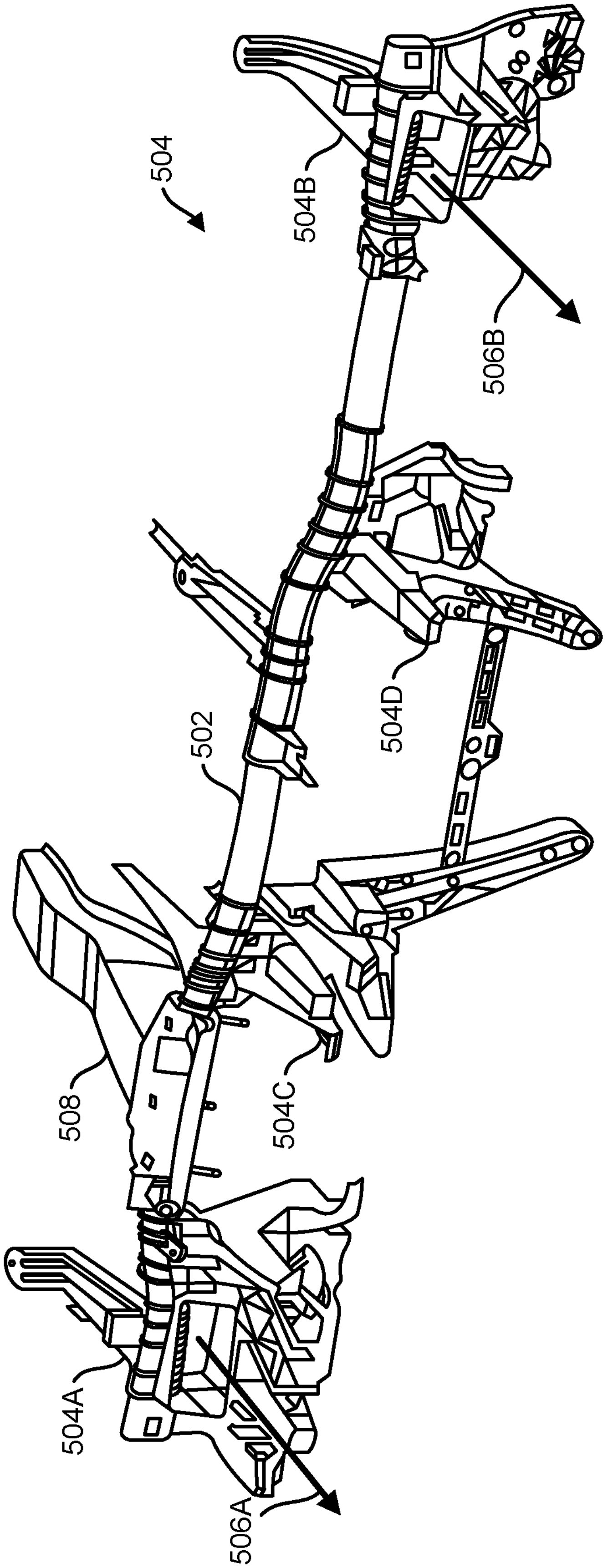
FIG. 5 shows a perspective view of another example of a cross-car beam assembly including a cross-car beam and cross-car beam structures.

FIG. 5 shows a perspective view of another example of a cross-car beam assembly 500 including a cross-car beam 502 and cross-car beam structures 504. The cross-car beam assembly 500 or any component(s) thereof can be used with one or more other examples described elsewhere herein.

The cross-car beam assembly 500 includes a cross-car beam 502. The ends of the cross-car beam 502 can be configured for attachment to respective A-pillars or other parts of a vehicle chassis. The cross-car beam 502 can be made of any suitable material, including, but not limited to, a metal such as an aluminum alloy and/or steel. For example, the cross-car beam 502 can be formed by extrusion of a material into a longitudinal element and thereafter optionally bending of the extrusion in one or more places to produce the shape of the cross-car beam 502.

The cross-car beam assembly 500 includes one or more cross-car beam structures 504. Here, cross-car beam structures 504A-504D are shown. Each of the cross-car beam structures 504A-504D is attached to the cross-car beam 502. One or more of the cross-car beam structures 504A-504D can be attached to some part of the vehicle chassis. For example, the cross-car beam structure 504A can be attached to a left A-pillar, and the cross-car beam structure 504B can be attached to a right A-pillar. The cross-car beam structures 504A-504D can be made of the same materials as each other, or by two or more different materials. The cross-car beam structures 504A-504D can be made using any of multiple processes. In some implementations, injection molding can be used. For example, a thermoplastic polymer material and/or a thermosetting polymer material can be used. In some implementations, the cross-car beam structures 504A-504D can be overmolded onto the cross-car beam 502. This can allow an air duct to be integrated into the cross-car beam structures 504A-504D and thereby improve packaging efficiency, simplify the dashboard structure, and improve the performance of the cross-car beam 502, for example as described below.

The cross-car beam 502 and one or more of the cross-car beam structures 504 can provide integration of an air duct so as to facilitate air flow from an HVAC unit (e.g., as shown in FIG. 3) to pass through the cross-car beam structure(s) 504 on the way toward air vents (e.g., as shown in FIG. 2). Here, the cross-car beam 502 and the cross-car beam structure 504A form a channel for air flow as schematically illustrated by an arrow 506A. The cross-car beam 502 and the cross-car beam structure 504B form another channel for air flow as schematically illustrated by an arrow 506B. The placement and construction of these channels can avoid difficult routing of ducts around parts of the cross-car beam assembly 500 and thereby enable superior packaging, better HVAC efficiency, and improved performance of the cross-car beam assembly 500.

The cross-car beam assembly 500 here also includes a steering column bracket 508 which can be positioned on the cross-car beam 502 in front of a driver's seat in the vehicle. For example, the steering column bracket 508 can hold a steering column to which a steering wheel is mounted.

Figure 6:
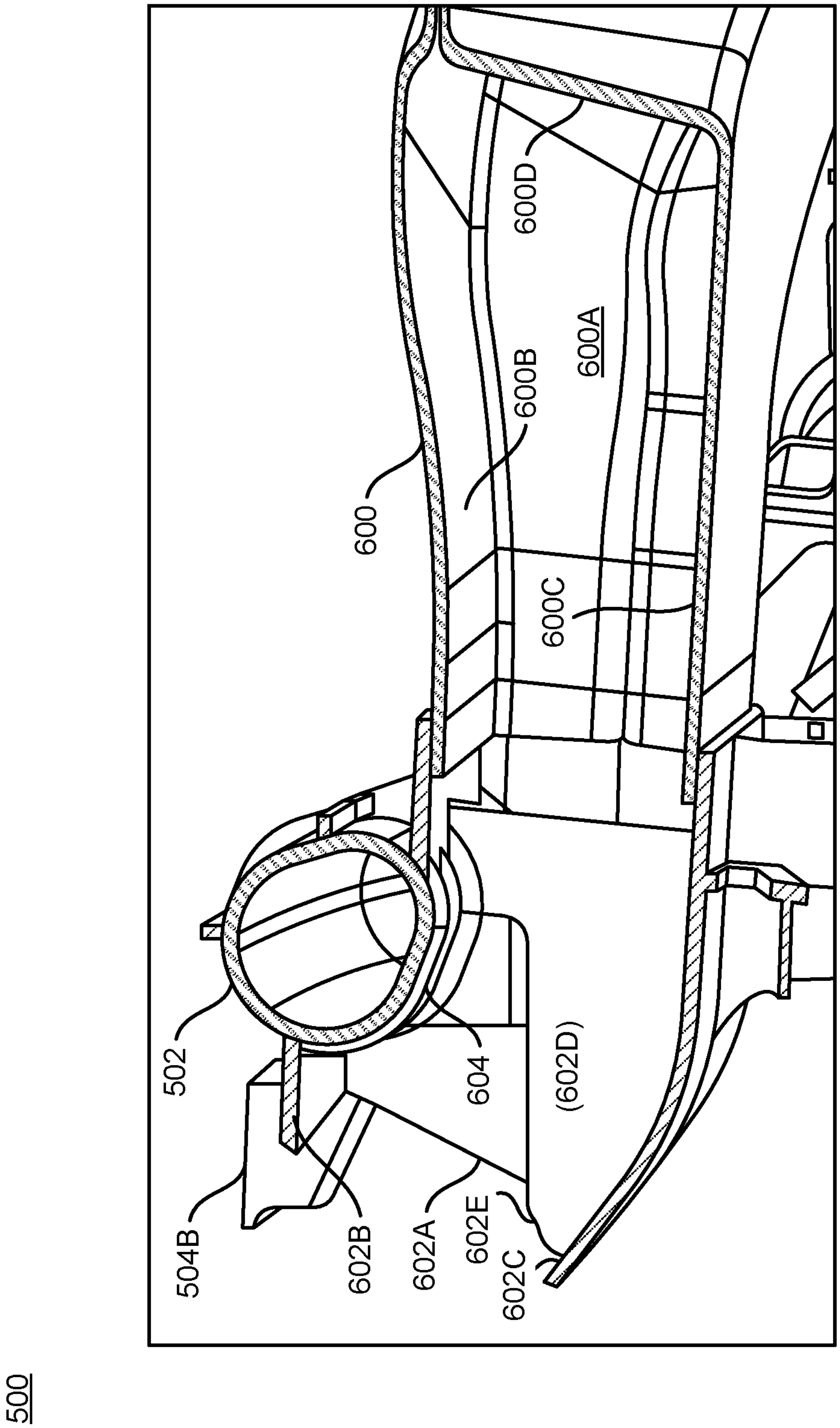
FIG. 6 shows an example cross section of a portion of the cross-car beam assembly of FIG. 5.

FIG. 6 shows an example cross section of a portion of the cross-car beam assembly 500 of FIG. 5. Any of the cross-car beam structures 504 (FIG. 5) can be configured for providing integration of an air duct. Here, the cross-car beam structure 504B is being shown, and an example of such integration will be described.

An air duct 600 is shown as extending toward and being could with the cross-car beam structure 504B. The air duct 600 can be made from any of multiple suitable materials. For example, the air duct 600 can include a thermoplastic polymer material and/or a thermosetting polymer material. The air duct 600 can have one or more walls. Here, the air duct 600 can be described as including walls 600A-600D. With the direction of air flow used for reference, as an example, the wall 600A can be referred to as a right wall, the wall 600B as a top wall, the wall 600C as a bottom wall, and the wall 600D (only partly visible due to the cross section) can be referred to as a left wall. For example, the interior of the air duct 600 can have a substantially rectangular profile defined by the walls 600A-600D.

The cross-car beam structure 504B can facilitate that the air flow is directed toward at least one air vent (e.g., the air vent 202B in FIG. 2). Similar to the description above regarding the air duct 600, this can be provided by way of one or more walls. Here, the cross-car beam structure 504B can be described as including a wall 602A (e.g., a right wall), a wall 602B (e.g., a top wall), a wall 602C (e.g., a bottom wall), and a wall 602D (e.g., a left wall, visible in FIG. 7). In some implementations, the cross-car beam structure 504B further includes at least one vane 602E (e.g., a fixed vane). For example, the walls 602A-602D can define a substantially rectangular profile for the air flow.

Due to the integration, the cross-car beam 502 and the cross-car beam structure 504B can provide a transition between on the one hand, the walls 600A-600D, and on the other hand, the walls 602A-602D. In some implementations, at least one of the walls 600A-600D of the air duct 600 can have one wall orientation, and at least one of the walls 602A-602D can be have another wall orientation. For example, the orientation of the wall 600B is such that the wall 602B is substantially parallel to and offset from the wall 600B in a direction that is substantially perpendicular to the plane of the wall 600B. The integration, moreover, can comprise that the cross-car beam 502 and the cross-car beam structure 504B form a transition between these wall orientations. In some implementations, the transition is nonlinear. For example, the cross-car beam 502 and at least one rib 604 of the cross-car beam structure 504B can provide a curved (e.g., convex) surface that connects to each of the walls 600B and 602B. Using the cross-car beam 502 and at least part of the cross-car beam structure 504B as one or more walls for providing air flow between an HVAC unit and an air vent can have significant advantages, such as more efficient packaging, better HVAC efficiency due to more direct routing, and improved performance of the cross-car beam assembly.

The above description illustrates an example of a system that includes: a cross-car beam (e.g., the cross-car beam 502); a cross-car beam structure (e.g., the cross-car beam structure 504B); an air duct (e.g., the air duct 600); and an air vent (e.g., the air vent 202B in FIG. 2). The cross-car beam and the cross-car beam structure form a channel (e.g., as schematically illustrated by the arrow 506B in FIG. 5) for air flow between the air duct and the air vent.

Figure 7:
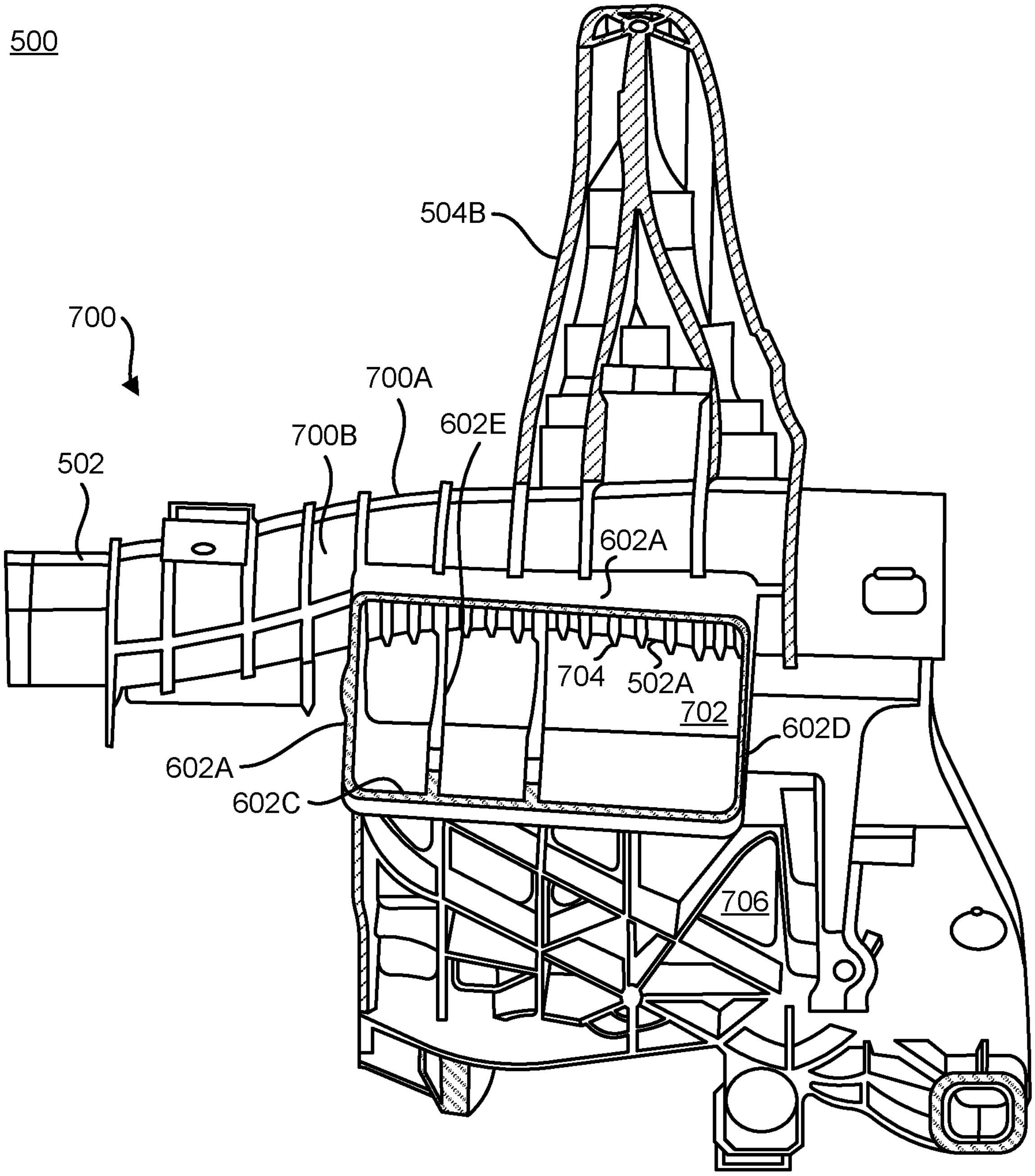
FIG. 7 shows a front perspective view of a right end of the cross-car beam assembly of FIG. 5.
Figure 8:
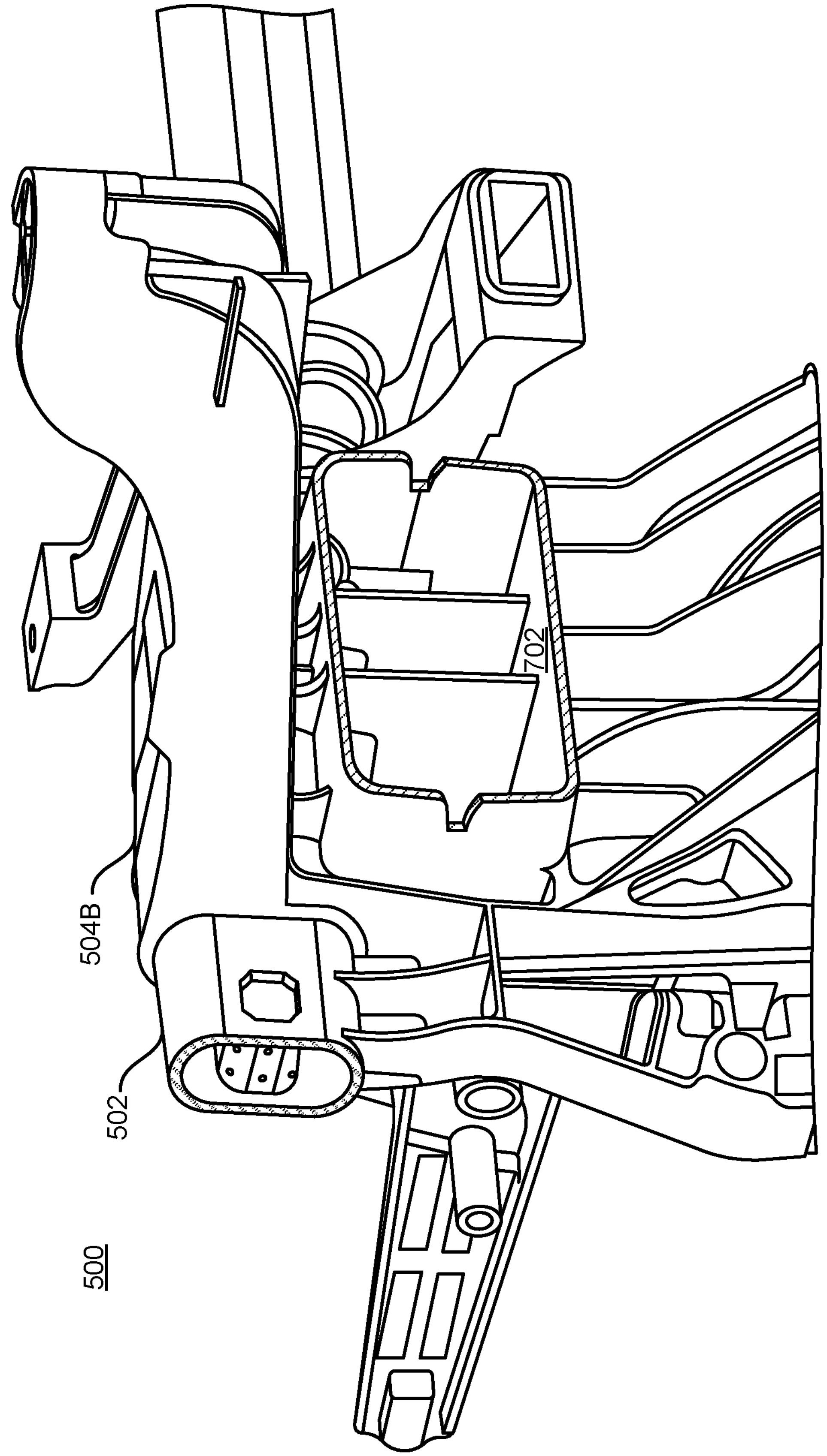
FIG. 8 shows a rear perspective view of the right end of the cross-car beam assembly of FIG. 5.

FIG. 7 shows a front perspective view of a right end of the cross-car beam assembly 500 of FIG. 5. FIG. 8 shows a rear perspective view of the right end of the cross-car beam assembly 500 of FIG. 5. For example, the right end of the cross-car beam assembly 500 can be situated near a front passenger of a left-side driving vehicle.

Here, the cross-car beam structure 504B is shown attached to the cross-car beam 502. In some implementations, the cross-car beam structure 504B is formed onto the cross-car beam 502 by an overmolding process. In such a process, the cross-car beam 502 can be secured within an injection mold that includes one or more dies, and molten material can be injected to form the shape of the cross-car beam structure 504B. In some implementations, the cross-car beam structure 504B can have a rib structure 700 fitting tightly around the cross-car beam 502. For example, the rib structure 700 can include at least one longitudinal rib 700A oriented substantially parallel with the cross-car beam 502, and at least one transverse rib 700B oriented substantially perpendicular to the cross-car beam 502.

The cross-car beam structure 504B and the cross-car beam 502 form a channel 702. In some implementations, the channel 702 is at least in part defined by the walls 600A-600D, and one or more transverse ribs 704, and one or more portions 502A of the external surface of the cross-car beam 502. In some implementations, the vane(s) 602E can extend between the wall 602C and the cross-car beam 502. Between adjacent ones of the transverse ribs 704, the portion(s) 502A can be exposed to the air flow. The transverse ribs 704 can be oriented in any direction, such as substantially along a direction of the air flow.

In some implementations, the transverse ribs 704 can be spaced more closely to each other than are the transverse ribs 700B. The portions 502A can correspond to where a die touches the cross-car beam 502 during an overmolding process. For example, the distribution of the portions 502A (and hence the transverse ribs 704) can ensure that there is sufficient contact between the die and the cross-car beam 502 during the overmolding process. As another example, the air flow through the channel 702 can be subject to conductive heat transfer due to the material of the cross-car beam 502 (e.g., a metal) at the portions 502A. The presence of the transverse ribs 704 (e.g., made of a polymer molding material) in the channel 702 can reduce the conductive heat transfer.

That is, the integration of the air duct with the cross-car beam structure 504B and the cross-car beam 502 places the channel 702 closer to the cross-car beam 502 than would have been the case if the air duct had been routed around the cross-car beam assembly. The channel 702 forms an open space that abuts the cross-car beam 502. Similar to other structural features such as openings 706 that are formed in the cross-car beam structure 504B, the channel 702 can increase the strength of the whole cross-car beam assembly. Accordingly, the channel 702 can provide more efficient packaging, better HVAC efficiency due to more direct routing, and improved performance of the cross-car beam assembly.

In some implementations, the cross-car beam structure 504B can be attached to the cross-car beam 502 by a technique other than overmolding. For example, the cross-car beam structure 504B is made in more than one piece and assembled to fit onto the cross-car beam 502.

Figure 9:
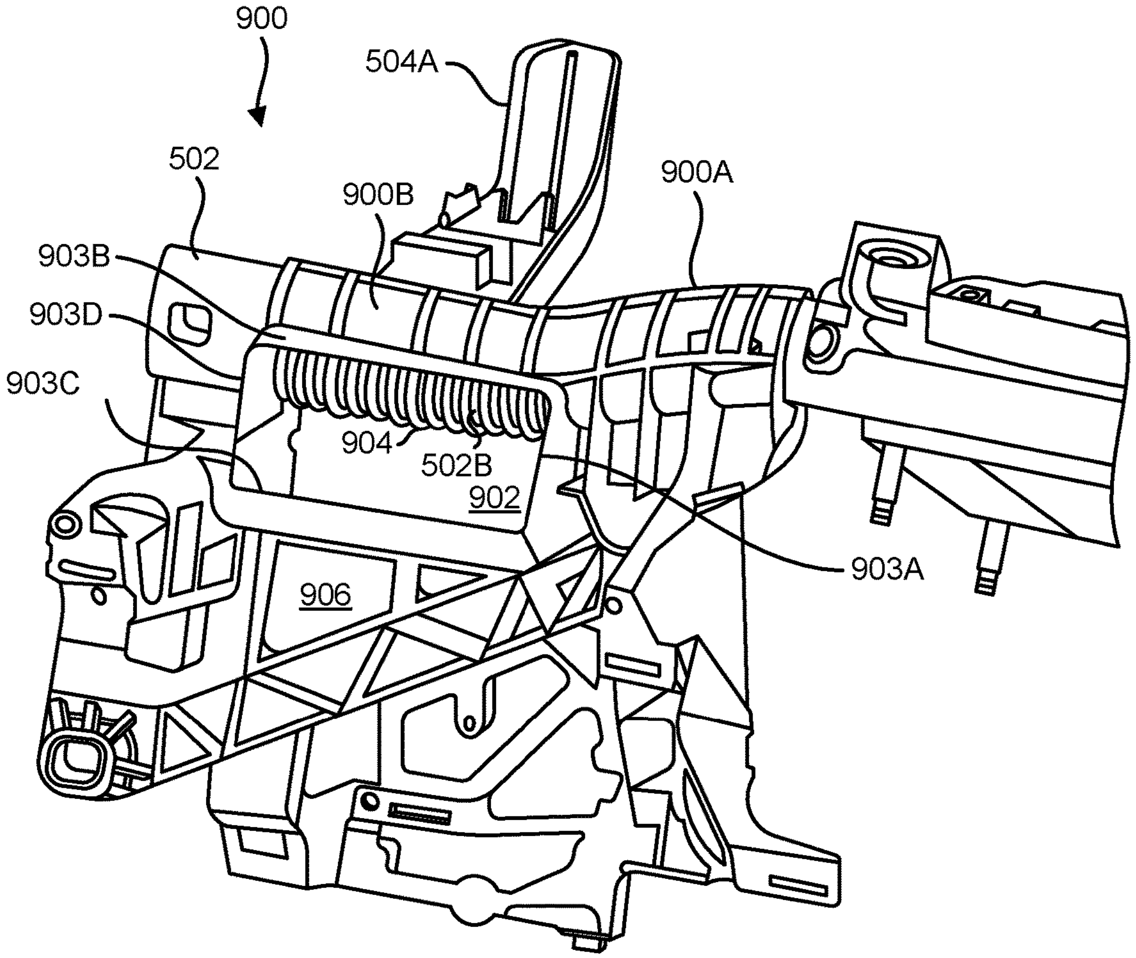
FIG. 9 shows a front perspective view of a left end of the cross-car beam assembly of FIG. 5.
Figure 10:
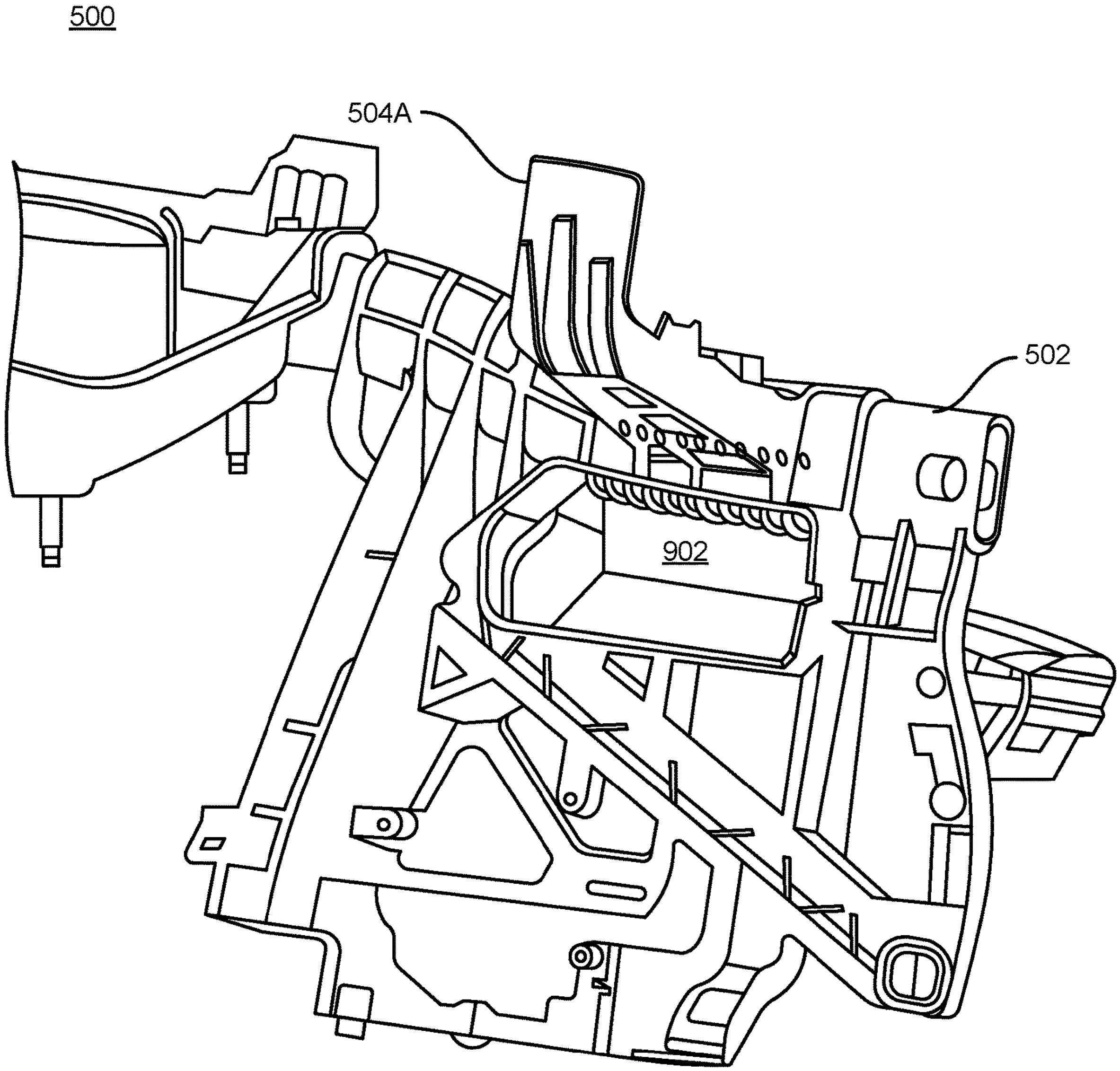
FIG. 10 shows a rear perspective view of the left end of the cross-car beam assembly of FIG. 5.

FIG. 9 shows a front perspective view of a left end of the cross-car beam assembly 500 of FIG. 5. FIG. 10 shows a rear perspective view of the left end of the cross-car beam assembly 500 of FIG. 5. For example, the left end of the cross-car beam assembly 500 can be situated near a driver of a left-side driving vehicle.

Here, the cross-car beam structure 504A is shown attached to the cross-car beam 502. In some implementations, the cross-car beam structure 504A is formed onto the cross-car beam 502 by an overmolding process. In such a process, the cross-car beam 502 can be secured within an injection mold that includes one or more dies, and molten material can be injected to form the shape of the cross-car beam structure 504A. In some implementations, the cross-car beam structure 504A can have a rib structure 900 fitting tightly around the cross-car beam 502. For example, the rib structure 900 can include at least one longitudinal rib 900A oriented substantially parallel with the cross-car beam 502, and at least one transverse rib 900B oriented substantially perpendicular to the cross-car beam 502.

The cross-car beam structure 504A and the cross-car beam 502 form a channel 902. In some implementations, the channel 902 is at least in part defined by walls 903A-903D, and one or more transverse ribs 904, and one or more portions 502B of the external surface of the cross-car beam 502. In some implementations, one or more vanes can extend between the wall 903C and the cross-car beam 502. Between adjacent ones of the transverse ribs 904, the portion(s) 502B can be exposed to the air flow. The transverse ribs 904 can be oriented in any direction, such as substantially along a direction of the air flow.

In some implementations, the transverse ribs 904 can be spaced more closely to each other than are the transverse ribs 900B. The portions 502B can correspond to where a die touches the cross-car beam 502 during an overmolding process. For example, the distribution of the portions 502B (and hence the transverse ribs 904) can ensure that there is sufficient contact between the die and the cross-car beam 502 during the overmolding process. As another example, the air flow through the channel 902 can be subject to conductive heat transfer due to the material of the cross-car beam 502 (e.g., a metal) at the portions 502B. The presence of the transverse ribs 904 (e.g., made of a polymer molding material) in the channel 902 can reduce the conductive heat transfer.

That is, the integration of the air duct with the cross-car beam structure 504A and the cross-car beam 502 places the channel 902 closer to the cross-car beam 502 than would have been the case if the air duct had been routed around the cross-car beam assembly. The channel 902 forms an open space that abuts the cross-car beam 502. Similar to other structural features such as openings 906 that are formed in the cross-car beam structure 504A, the channel 902 can increase the strength of the whole cross-car beam assembly. Accordingly, the channel 902 can provide more efficient packaging, better HVAC efficiency due to more direct routing, and improved performance of the cross-car beam assembly.

In some implementations, the cross-car beam structure 504A can be attached to the cross-car beam 502 by a technique other than overmolding. For example, the cross-car beam structure 504A is made in more than one piece and assembled to fit onto the cross-car beam 502.

With reference again briefly to FIG. 4, a cross-car beam assembly can have a manifold (e.g., the manifold 400)

between an HVAC unit and the air ducts leading to respective air vents. As such, the air ducts can be coupled to the manifold and to individual cross-car beam structures during assembly. Such assembly can have advantageous aspects in some implementations. For example, the manifold can be installed into the system without using separate fasteners or adhesives, such as illustrated in the following examples.

Figure 11:
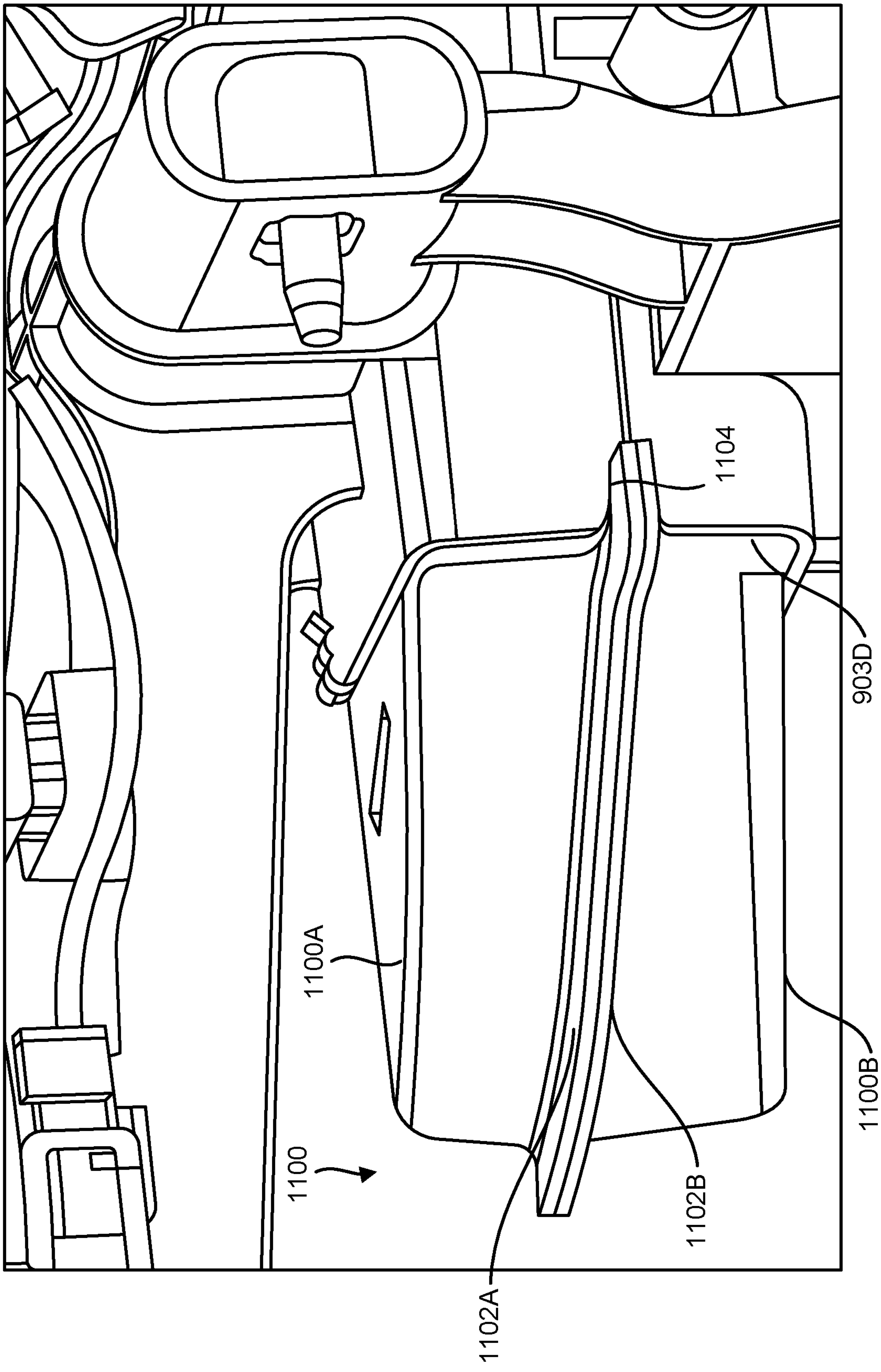
FIG. 11 shows an example cross section of a duct entering the cross-car beam structure at the left end of the cross-car beam assembly of FIG. 5.

FIG. 11 shows an example cross section of a duct 1100 entering the cross-car beam structure 504A at the left end of the cross-car beam assembly 500 of FIG. 5. The duct 1100 can be used with one or more other examples described elsewhere herein. The cross section is here taken in a part of the duct 1100 that is facing away. In some implementations, the duct 1100 can be formed by compression molding. For example, two thick non-woven fiber sheets can be used in forming the duct in two steps: 1) compression of the non-woven fiber material into the respective halves of the duct; and 2) "welding" the halves together, such as by using flanges. The sheets can include non-woven fiber of polyethylene terephthalate and/or polyethersulfone. As another example, the duct 1100 can be formed by blow molding, such as from high-density polyethylene.

The duct 1100 includes clamshell components 1100A-1100B. The clamshell components 1100A-1100B can be positioned against each other. For example, the clamshell component 1100A can include a flange 1102A, and the clamshell component 1100B can include a flange 1102B. The flanges 1102A-1102B can abut each other, for example as shown in the illustration. The cross-car beam structure 504A can include at least one slit 1104. For example, the slit 1104 is here positioned in the wall 903D. The slit 1104 can be configured to hold the flanges 1102A-1102B upon assembly.

Figure 12:
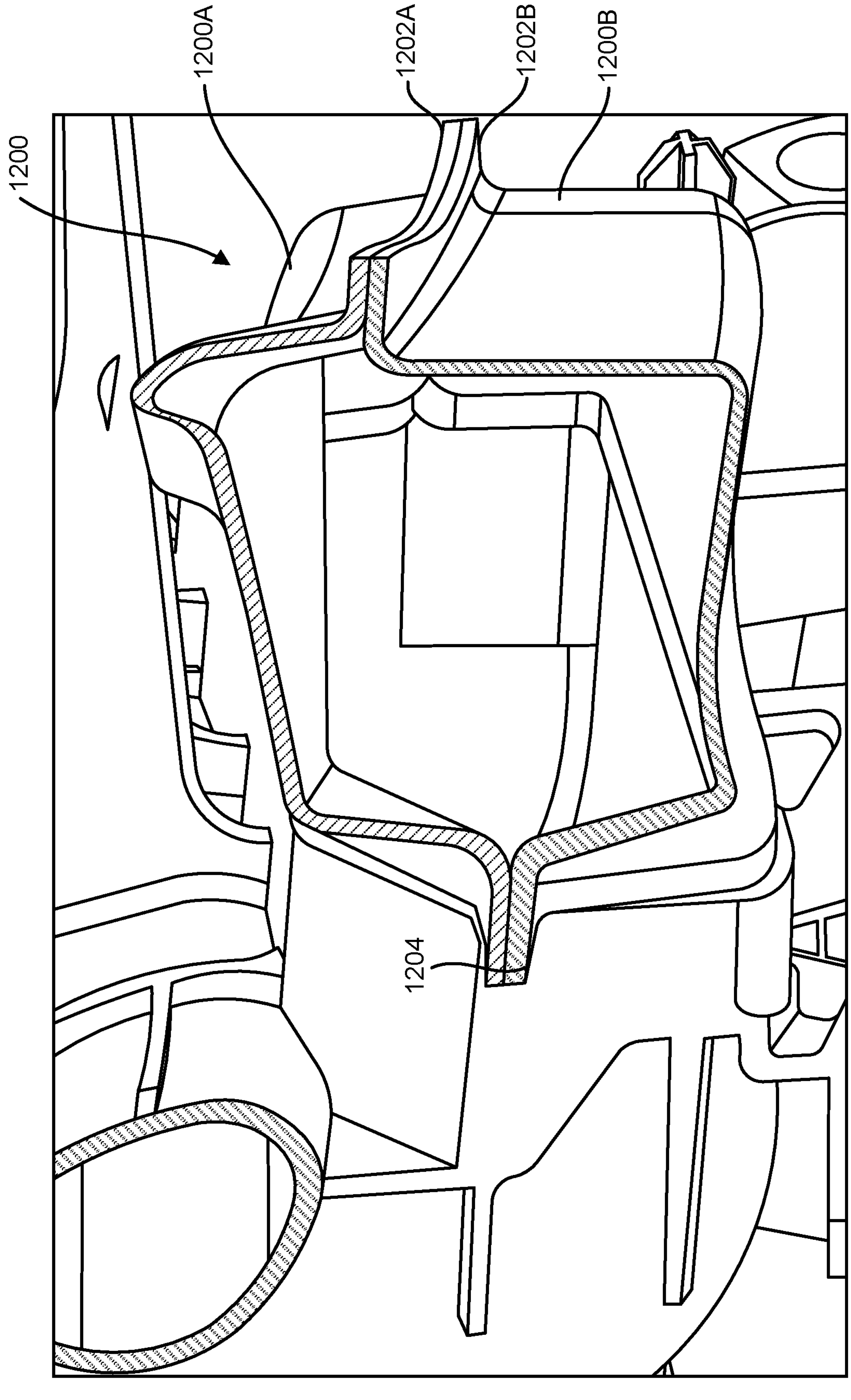
FIG. 12 shows an example cross section of a duct entering one of the cross-car beam structures of the cross-car beam assembly of FIG. 5.

FIG. 12 shows an example cross section of a duct 1200 entering one of the cross-car beam structures 504 of the cross-car beam assembly 500 of FIG. 5. The duct 1200 can be used with one or more other examples described elsewhere herein. For example, the duct 1200 can be formed by compression molding. The duct 1200 includes clamshell components 1200A-1200B. The clamshell components 1200A-1200B can be positioned against each other. For example, the clamshell component 1200A can include a flange 1202A, and the clamshell component 1200B can include a flange 1202B. The flanges 1202A-1202B can abut each other, for example as shown in the illustration. The cross-car beam structure 504 can include at least one slit 1204. The slit 1204 can be configured to hold the flanges 1202A-1202B upon assembly.

Figure 13:
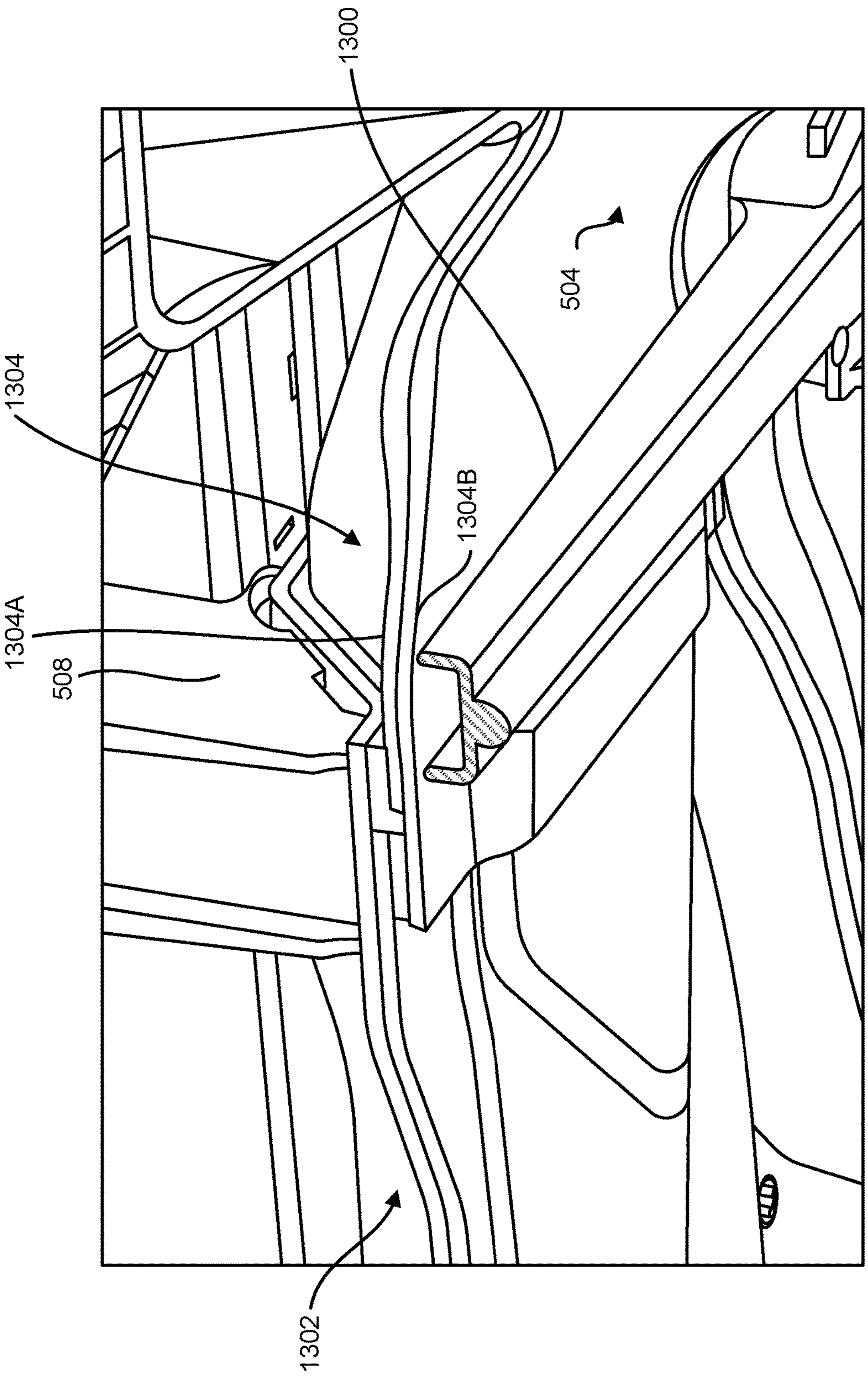
FIG. 13 shows an example of duct pieces sandwiched between the steering column bracket of FIG. 5 and one of the cross-car beam structures of the cross-car beam assembly of FIG. 5.

FIG. 13 shows an example of duct pieces sandwiched between the steering column bracket 508 of FIG. 5 and one of the cross-car beam structures 504 of the cross-car beam assembly 500 of FIG. 5. Any of the duct pieces can be used with one or more other examples described elsewhere herein. The cross-car beam structure 504 here includes an arm 1300. In some implementations, the arm 1300 can be configured to carry one or more components of a vehicle dashboard. Here, an air duct 1302 includes air duct components 1302A-1302B. For example, the air duct components 1302A-1302B positioned against each other. Here, an air duct 1304 includes air duct components 1304A-1304B. For example, the air duct components 1304A-1304B positioned against each other. A joint between the air ducts 1302 and 1304 can be formed using the steering column bracket 508 and the cross-car beam structure 504. In some implementations, this can be done by sandwiching the respective air duct components 1302A-1302B and 1304A-1304B between the steering column bracket 508 and the cross-car beam structure 504. For example, making the joint can include forming a four-layer structure.

Figure 14:
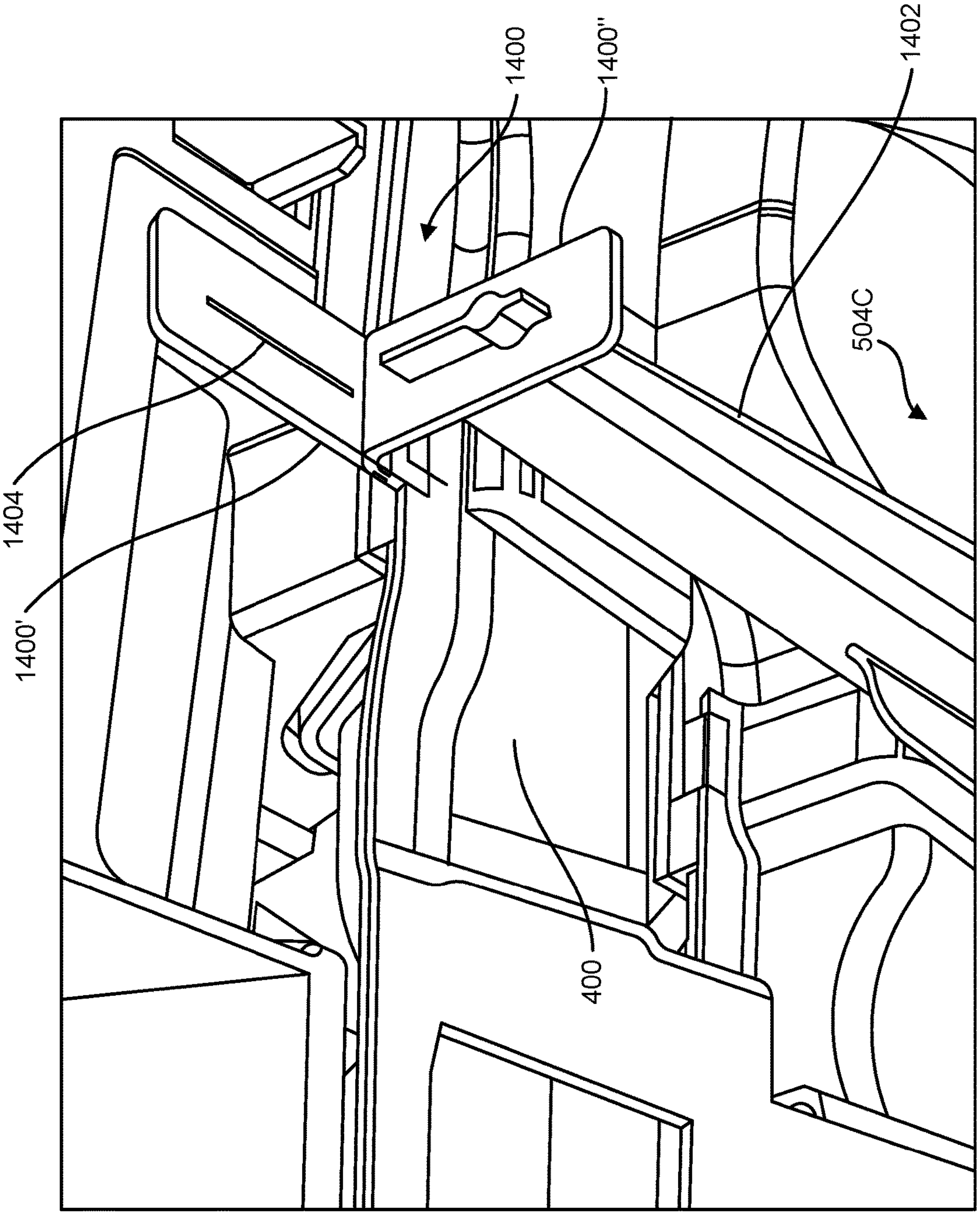
FIG. 14 shows an example of the manifold of FIG. 4 having a tab for installation.

FIG. 14 shows an example of the manifold 400 of FIG. 4 having a tab 1400 for installation. The tab 1400 can be used with one or more other examples described elsewhere herein. The cross-car beam structure 504C here includes an arm 1402. A tab 1400' here illustrates a "before state" of the tab 1400. For example, after manufacture but before assembly, the manifold 400 has the tab 1400 extending in the direction corresponding to the tab 1400'. The tab 1400 includes a slit 1404. A tab 1400" here illustrates an "after state" of the tab 1400. For example, during the assembly, tab 1400 of the manifold 400 can be folded relative to a remainder of the manifold 400 into the orientation corresponding to the tab 1400". In some implementations, this can involve causing the slit 1404 and the arm 1402 to engage with each other. For example, a portion of the arm 1402 can enter the slit 1404.

Figure 15:
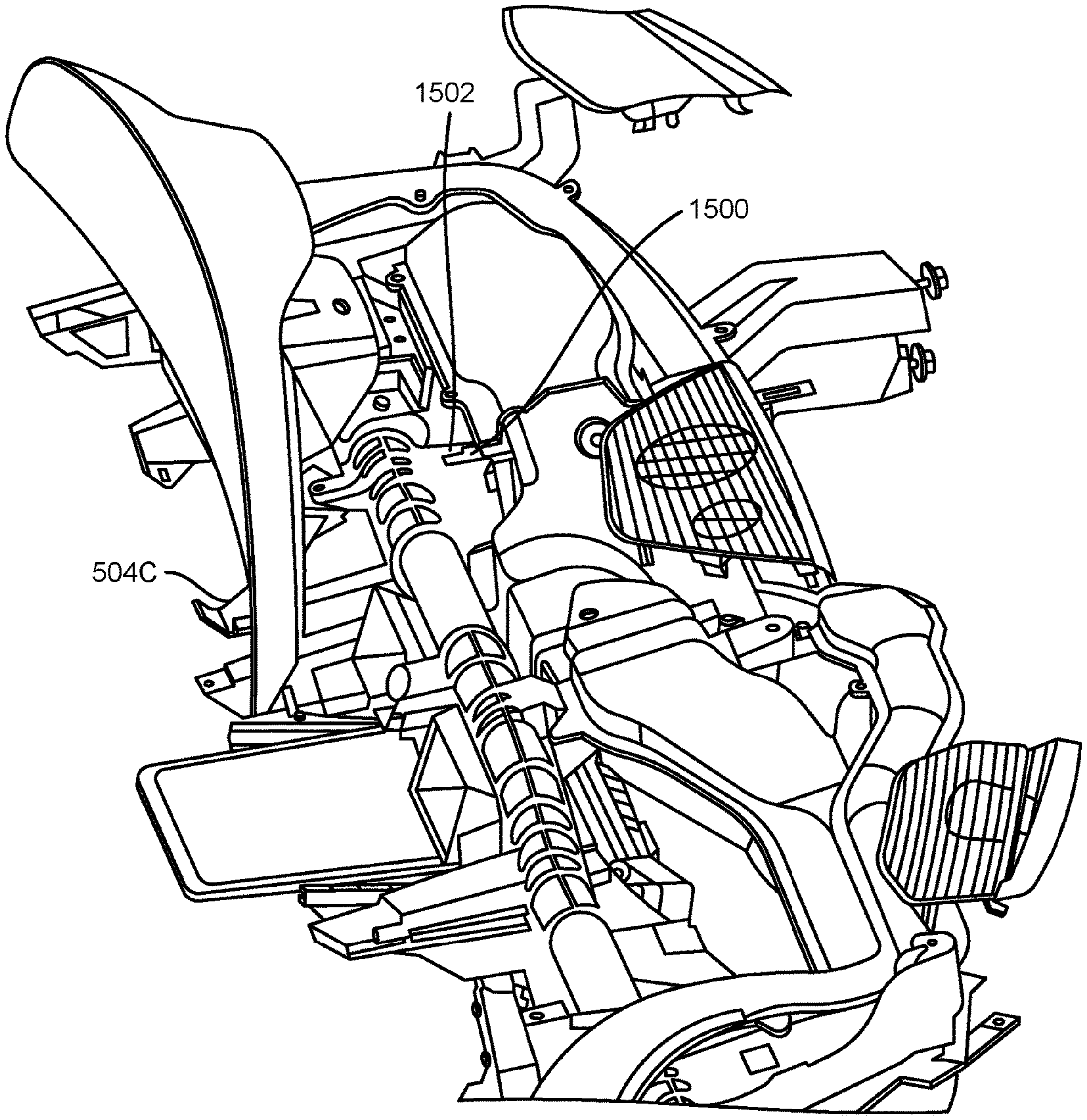
FIG. 15 shows an example of installation of the manifold of FIG. 4 without separate fasteners and adhesive.

FIG. 15 shows an example of installation of the manifold 400 of FIG. 4 without separate fasteners and adhesive. The manifold 400 can include a guide tab 1500. The cross-car beam structure 504C can include a receptacle 1502. In some implementations, the manifold 400 can be installed in a system (e.g., the vehicle being assembled) at least in part by way of the guide tab 1500 being inserted into the receptacle 1502.

The terms "substantially" and "about" used throughout this Specification are used to describe and account for small fluctuations, such as due to variations in processing. For example, they can refer to less than or equal to +5%, such as less than or equal to +2%, such as less than or equal to +1%, such as less than or equal to +0.5%, such as less than or equal to +0.2%, such as less than or equal to +0.1%, such as less than or equal to +0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A system comprising:

a cross-car beam;

a cross-car beam structure attached to the cross-car beam;

an air duct, wherein the air duct is formed by a first clamshell component and a second clamshell component positioned against each other, wherein each of the first and second clamshell components include a respective flange, and wherein the respective flanges abut each other;

a slit formed in the cross-car beam structure, wherein the slit is configured to hold the respective flanges that are abutting each other;

a manifold, wherein the air duct is coupled to the manifold, wherein the manifold is installed in the system without separate fasteners and adhesive, and wherein the manifold is installed in the system by way of the slit holding the respective flanges that are abutting each other;

a tab extending from the manifold, the tab including a slit, wherein the manifold is installed in the system by way of the tab being folded relative to a remainder of the manifold so that a portion of the cross-car beam structure enters the slit; and an air vent, wherein the cross-car beam and the cross-car beam structure form a channel for air flow between the air duct and the air vent.

2. The system of claim 1, wherein the air vent is configured for an outboard position in a dashboard of a vehicle.

3. The system of claim 1, wherein the channel forms an open space that abuts at least the cross-car beam.

4. The system of claim 1, wherein the cross-car beam structure is attached to the cross-car beam by being overmolded onto the cross-car beam.

5. The system of claim 1, wherein the channel includes ribs formed by the cross-car beam structure, the ribs positioned against an external surface of the cross-car beam, and wherein portions of the external surface of the cross-car beam are exposed to the air flow between the ribs.

6. The system of claim 5, wherein the ribs are oriented substantially along a direction of the air flow.

7. The system of claim 1, wherein the air duct is formed by a first clamshell component and a second clamshell component positioned against each other.

8. The system of claim 7, wherein each of the first and second clamshell components include a respective flange, and wherein the respective flanges abut each other.

9. The system of claim 8, further comprising a slit formed in the cross-car beam structure, wherein the slit is configured to hold the respective flanges that are abutting each other.

10. The system of claim 1, further comprising a steering column bracket attached to the cross-car beam, wherein the air duct includes a first air duct and a second air duct, and wherein a joint between the first and second air ducts is formed by sandwiching of the first and second air ducts between the steering column bracket and the cross-car beam structure.

11. The system of claim 1, wherein the channel is defined by a first wall orientation and a second wall orientation, and wherein the cross-car beam and the cross-car beam structure form a nonlinear transition between the first and second wall orientations.

12. The system of claim 11, wherein the second wall orientation is substantially parallel to and offset from the first wall orientation in a direction that is perpendicular to a plane of the first wall orientation.

13. The system of claim 1, further comprising a guide tab extending from the manifold, wherein installing the manifold in the system comprises inserting the guide tab into a receptacle at the cross-car beam structure.

14. The system of claim 1, wherein the channel formed by the cross-car beam and the cross-car beam structure comprises integration of the air duct into a cross-car beam assembly so that the air flow passes through the cross-car beam structure.

* * * * *